United States Patent [19]
Good

[11] 3,817,639
[45] June 18, 1974

[54] LOCKING DEVICE FOR SECURING A PIVOTAL MEMBER TO ONE END OF AN ARM MEMBER

[75] Inventor: Arthur L. Good, Elkhart, Ind.
[73] Assignee: Reese Products, Inc., Elkhart, Ind.
[22] Filed: May 15, 1973
[21] Appl. No.: 360,606

[52] U.S. Cl. .............................................. 403/122
[51] Int. Cl. ....... B25j 3/38, F16b 7/00, F16c 11/06
[58] Field of Search ............ 403/76, 122, 143, 315, 403/56, 141, 133

[56] References Cited
UNITED STATES PATENTS
| | | | |
|---|---|---|---|
| 2,340,475 | 2/1944 | Johnson | 403/122 X |
| 2,365,520 | 12/1944 | Bogue | 403/315 X |
| 2,530,554 | 11/1950 | Tinnerman | 403/122 |
| 2,987,333 | 6/1961 | Lobdell | 403/122 |

*Primary Examiner*—George V. Larkin
*Attorney, Agent, or Firm*—Oltsch & Knoblock

[57] ABSTRACT

A locking device which is utilized for securing a pivotal member, such as a ball part, to one end of an arm member which can have a socket part connected thereto to receive a ball part. Such a locking device includes a removable generally U-shaped elongated lock part which cooperates with a slot formed in the side wall of the socket part and which flexibly contacts and interlocks with the arm member to form a protrusion which extends into the socket part opening beneath the head of the ball part, thereby serving to prevent the ball part from being separated from the socket part.

4 Claims, 8 Drawing Figures

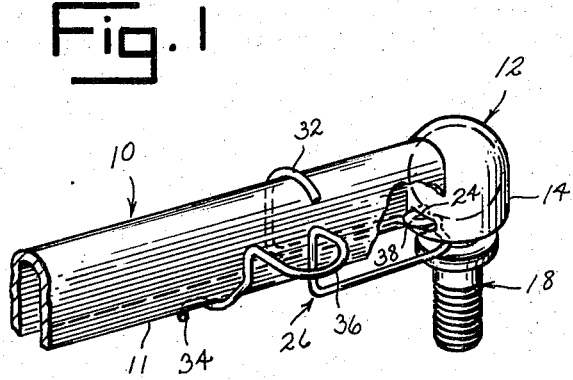
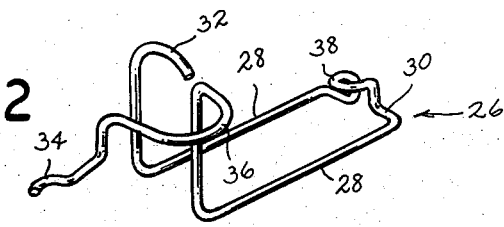
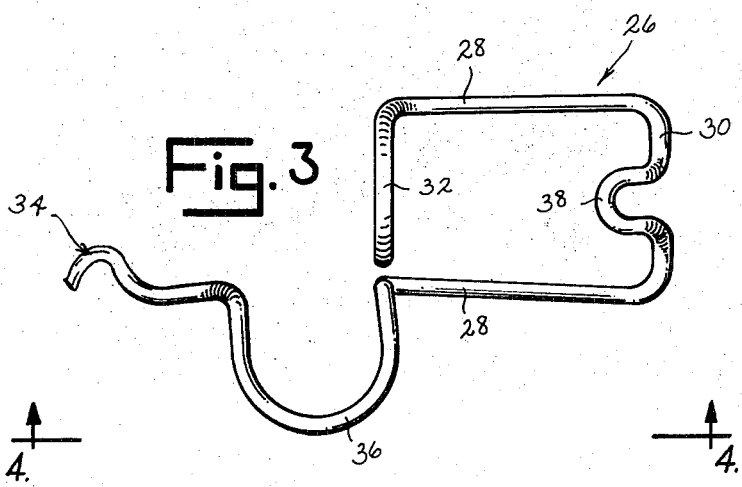
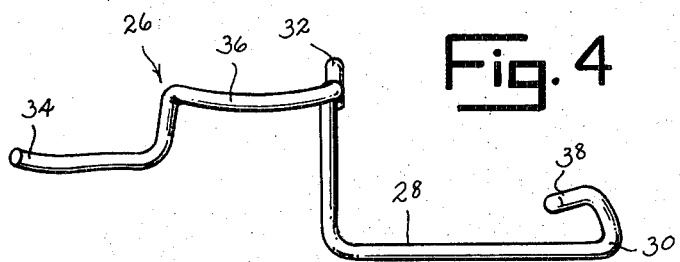

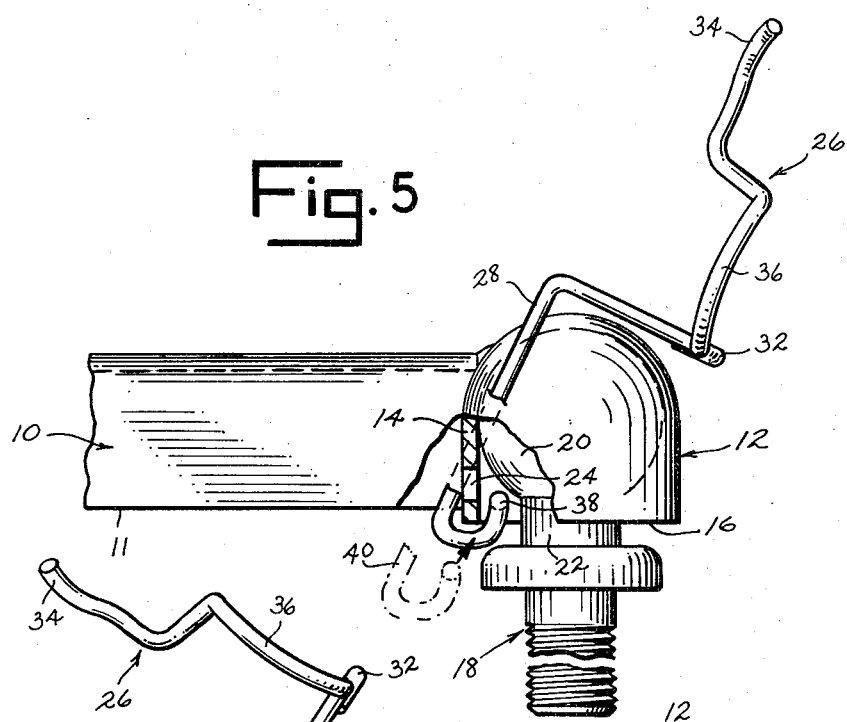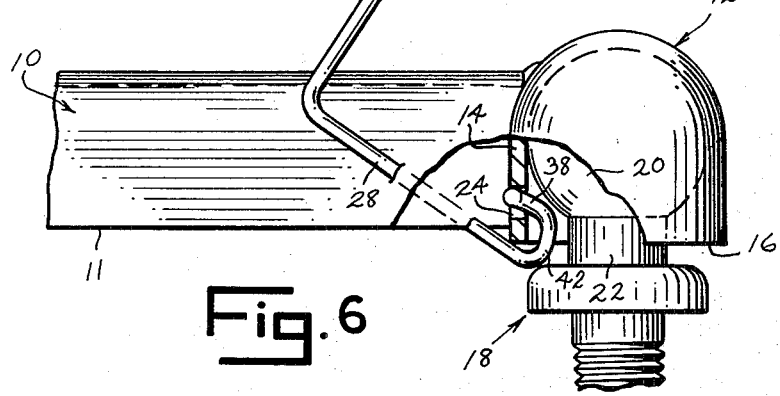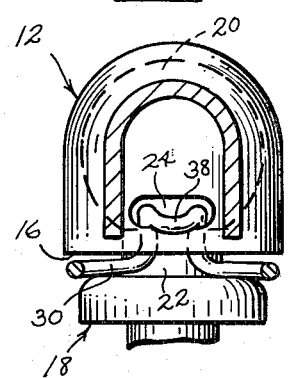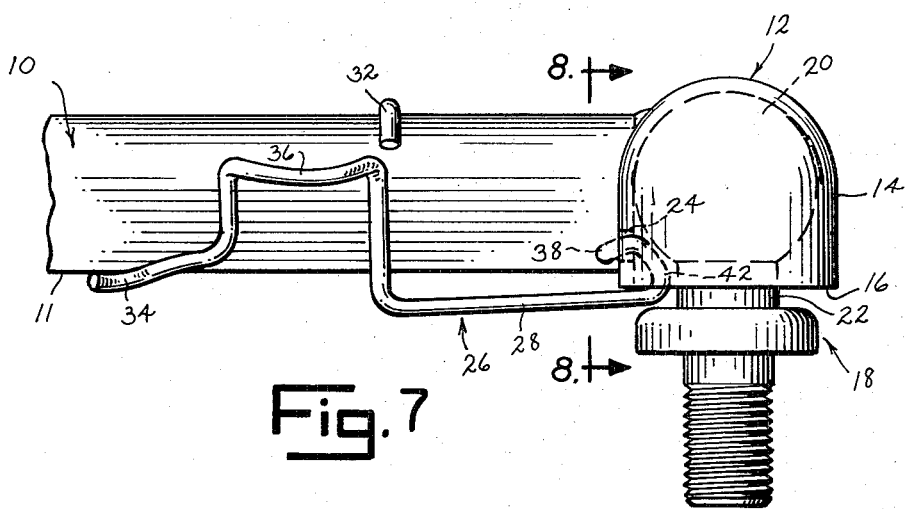

LOCKING DEVICE FOR SECURING A PIVOTAL MEMBER TO ONE END OF AN ARM MEMBER

SUMMARY OF THE INVENTION

This invention relates to a locking device for securing a pivotal member to one end of an arm member and will have specific, but not limited, application to the securement of a ball within the socket of a ball and socket joint.

The locking device of this invention includes a removable generally U-shaped elongated lock part which has a return-bent lip formed in the U-bend of the part. This lip fits within a slot in a receiver part which is carried at the end of the arm member and is positoned under the head of a pivotal member previously inserted into the receiver part. The legs of the lock part are formed so as to clamp the arm member in spring-like fashion, thereby securing the lock part to the receiver part with the lip protruding under the pivotal member head to prevent the pivotal member from being withdrawn from the receiver part. The lock part may be economically formed from wire or a stamping and may be coupled to and uncoupled from the arm member in a simple and rapid manner.

Accordingly, it is an object of this invention to provide a locking device for securing a pivotal member to one end of an arm member.

Another object of this invention is to provide a locking device for securing a ball part within a socket part carried at one end of an arm or similar structural member.

Another object of this invention is to provide an economical locking device for securing a pivotal member to one end of an arm member in a rapid manner.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of an arm carrying a socket part having a ball part fitted therein and secured by the locking device of this invention, said arm member being shown in fragmentary form to better illustrate the invention.

FIG. 2 is a perspective view of the lock part utilized in this invention to secure the ball part to the socket part of FIG. 1.

FIG. 3 is a top plan view of the lock part shown in FIG. 2.

FIG. 4 is a side view of the lock part as seen along line 4—4 of FIG. 3.

FIGS. 5–7 are detailed views in chronological sequence showing the lock part of the locking device being inserted into position to secure the ball part in the socket part.

FIG. 8 is a sectional view taken along line 8—8 of FIG. 7.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The reference numeral 10 refers to an arm having a socket 12 fixedly connected, such as by welding, to one of its ends. Socket 12 is defined by an annular side wall 14 and includes a lower perimeter edge 16 which serves to define the opening into the socket. A ball member 18 fits pivotally within the socket 12. Ball member 18 includes a spherical head 20 and a reduced neck portion 22 which can be adapted, such as by external threading, to be connected to a suitable structural support. Socket 12 and ball member 18 form what is commonly known as a ball and socket joint having many commercial applications.

To secure ball member 18 to socket 12, side wall 14 of the socket is provided with a slot 24 which is located next to and in alignment with arm 10 and which is spaced from edge 16 of the socket. Slot 24 is located, with ball member 18 inserted into socket 12, below the point of maximum transverse dimension of head 20 as defined by a plane extending perpendicularly to the axis of neck portion 22 of the ball member. A flexible, generally U-shaped lock part 26 is provided. Lock part 26 includes legs 28 and an interconnecting web 30. One leg 28 of lock part 26 has a clip 32 formed at its end. A tab 34 is formed at the end of the opposite leg 28 of the lock part. If desired, a loop 36 forming a thumb grip may be formed in leg 28 between tab 34 and web 30. Clip 32, tab 34 and loop 36 are upwardly offset from web 30. An upwardly return-bent lip 38 is formed in web 30. Lock part 26 is preferably formed of spring rod so as to allow for the flexibility of legs 28.

The manner of operation of lock part 26 is best illustrated in FIG. 5–7. With legs 28 straddling arm 10 and socket 12 and with web 30 extending under the arm, the lock part is brought upwardly from the broken line position 40 into the solid line position shown in FIG. 5, with lip 38 extending around perimeter edge 16 of socket 12 and located in the opening in the socket oppositely from slot 24 therein. Lock part 26 is then rotated counterclockwise as sequentially viewed in FIGS. 6 and 7, first causing its legs 28 to pass on each side of arm 10 and lip 38 to be rotated into slot 24 and secondly causing clip 32 to extend over the top of arm 10 and tab 34 to fit under the bottom of the arm. This releasable interlocking arrangement of lock part 26 with arm 10 is perhaps best shown in FIG. 1. As seen in FIG. 3, leg 28 which carries tab 34 is bent inwardly toward the other leg 28 in its free, disengaged state so that as lock part 26 is shifted downwardly from the position shown in FIG. 5 to the position shown in FIG. 7, leg 28 thereof which carries tab 34 will be flexed outwardly as the tab slides down over th outer side of arm 10 and reaches the lower edge 11 of the arm, at which time the tab will slip under the arm and be held there by the spring action in the tab-carrying leg which remains at least slightly flexed. With tab 34 so interlocked under arm 10, clip 32 of the lock part will be pulled downwardly over the arm to firmly secure th lock part to the arm.

As best seen in FIG. 7, lip 38 of lock part 26 includes a bend 42 which protrudes under head 20 of ball member 18 when the lock part is secured to arm 10, thus preventing the ball member from being withdrawn from socket 12 while still permitting pivotal movement of the ball member relative to arm 10. The curvature of lip 38 is so related to the size of slot 24 in socket 12 and the location of the slot from socket edge 16 that the lip freely enters the slot as the lock part is rotated from the position in FIG. 5 into the position in FIG. 7.

To release ball member 18 from socket 12 and arm 10, one need only grasp loop 36 or tab 34 of the lock part and pull the leg 28 associated with the tab laterally outwardly causing the tab to be freed from under arm 10. The lock part is then pivoted clockwise as would be viewed in FIGS. 5–7 until lip 38 is disengaged from slot 24 in the socket and slipped downwardly into the broken line position 40 shown in FIG. 5. Since clip 32 is designed to extend nearly from one leg 28 to the other leg 28 of the lock part, the lock part can be released after ball member 18 is disengaged from socket 12 since the lock part will hang loosely upon arm 10 and be supported by the clip until the need for recoupling ball member 18 to the arm again occurs.

It is to be understood that arm 10, illustrated in the preferred embodiment as a channel member, can also be of a tubular construction, whether circular, rectangular or square in cross section. Additionally, the locking device of this invention can be utilized to couple other types of pivotal members. It is envisioned that this invention can be utilized in the securing of a rotative shaft to an arm-connected cylindrical sleeve.

It is to be understood that the invention is not to be limited to the details above given but may be modified within the scope of the appended claims.

What I claim is:

1. A locking device for securing a pivotal member to one end of an arm member, said pivotal member having a head portion and a reduced neck portion, a trasversely oriented receiver part carried at said end of the arm member and having an opening therein defined by a side wall, said locking device comprising an elongated removable generally U-shaped lock part, said lock part including two legs and an interconnecting web, said lock part having the end portion of one leg formed into a laterally bent tab and having the end portion of the other leg formed into a clip, said lock part web including a return bent lip, said receiver part side wall including a perimeter edge through which the head portion of said pivotal member is inserted into the opening thereof, said receiver part side wall having a slot formed therein next to and in general alignment with said arm member, said slot being spaced from said perimeter edge, said pivotal member fitting pivotally within said receiver part with the head portion thereof extending into said opening and with said neck portion thereof being located generally oppositely of said slot, said lock part lip fitted around said perimeter edge of the receiver part side wall and into said slot with parts of said lip protruding under said head portion and being directed toward said neck portion of the pivotal member fitted within said opening to prevent said pivotal member from being withdrawn from said receiver part through the perimeter edge thereof, said lock part clip fitting over one side part of said arm member and spaced from said receiver part, said lock part tab fitting over another side part of said arm member and spaced from said receiver part and located oppositely of said clip, said one lock part leg being flexed with said tab being spring urged over and into contact with said arm member to secure said lock part to said arm member and receiver part.

2. The locking device of claim 1 wherein said one lock part leg includes a laterally projecting grip means between said tab and said web of the lock part, said grip means for flexing said one leg outwardly relative to said arm member to shift said tab from over said arm out of contact therewith to free said lock part from engagement with said receiver part whereby said pivotal member can be freed from said receiver part.

3. The locking device of claim 1 wherein said receiver part is a socket and said pivotal member is a ball part fitted pivotally within said socket.

4. A locking device for securing a pivotal member to one end of an arm member, said pivotal member constituting a ball having a head portion and a reduced neck portion, a socket part carried at said end of the arm member and having an opening therein defined by a side wall, said locking device comprising a removable generally U-shaped lock part, said socket part side wall including a perimeter edge through which the head portion of said ball is inserted into the opening thereof, said socket part side wall having a slot formed therein next to and in general alignment with the said arm member, said slot being spaced from said perimeter edge, said ball fitting pivotally within said socket part with the head portion thereof extending into said opening and with said neck portion thereof being located generally oppositely of said slot, said lock part fitted around said perimeter edge of the receiver part side wall and into said slot with part of said lock part protruding under said head portion and being directed toward said neck portion of the ball fitted within said opening to prevent said ball from being withdrawn from said socket part through the perimeter edge thereof.

* * * * *